Figure 1:
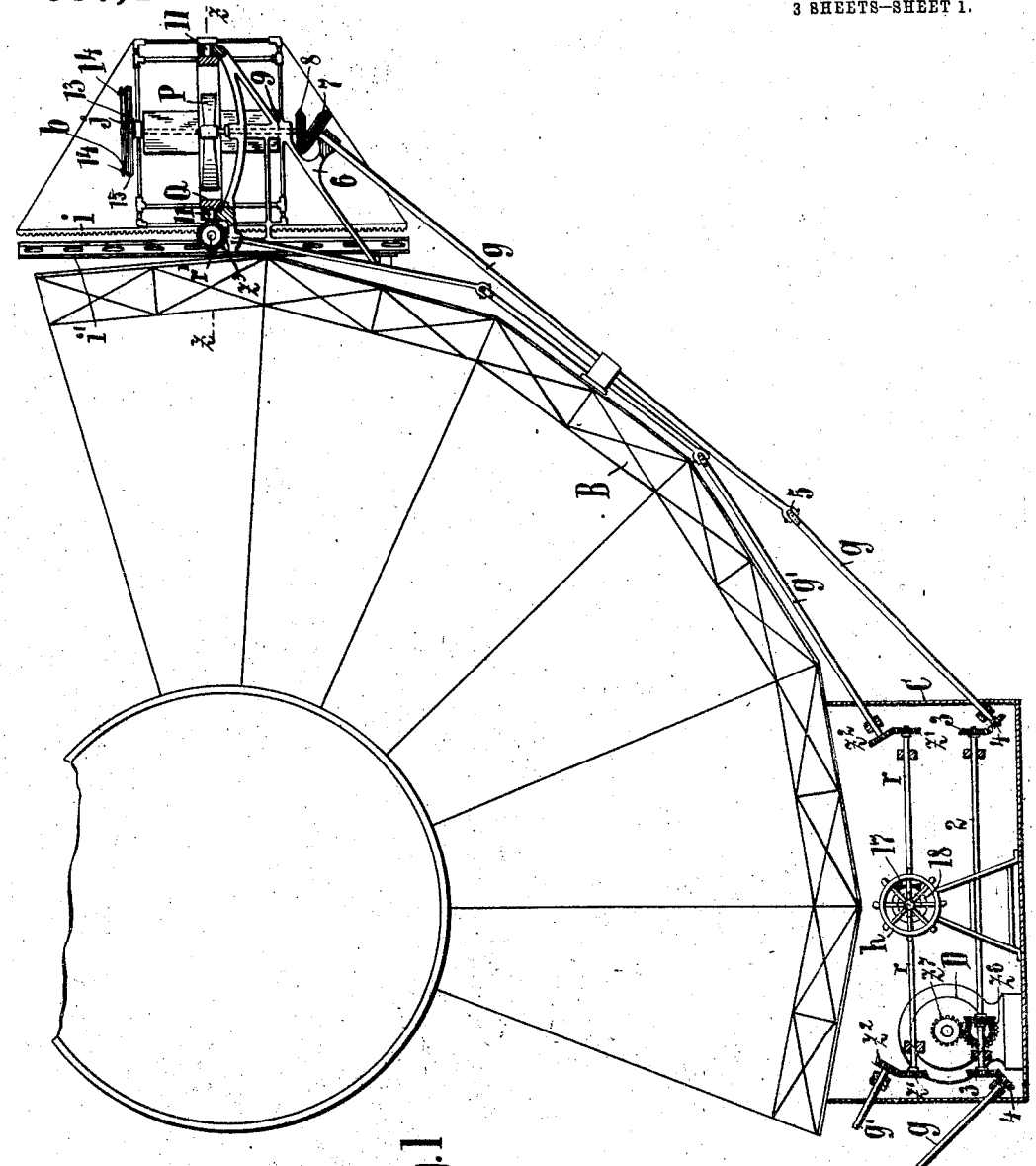

J. SCHÜTTE.
STEERING MECHANISM FOR AIRSHIPS.
APPLICATION FILED JULY 14, 1909.

997,419.

Patented July 11, 1911.
3 SHEETS—SHEET 1.

Witnesses.
Jesse N. Lutton.
M. J. Ellis.

Inventor.
Johann Schütte
by Henry Orth
Atty.

J. SCHÜTTE.
STEERING MECHANISM FOR AIRSHIPS.
APPLICATION FILED JULY 14, 1909.
997,419.
Patented July 11, 1911.
3 SHEETS—SHEET 2.
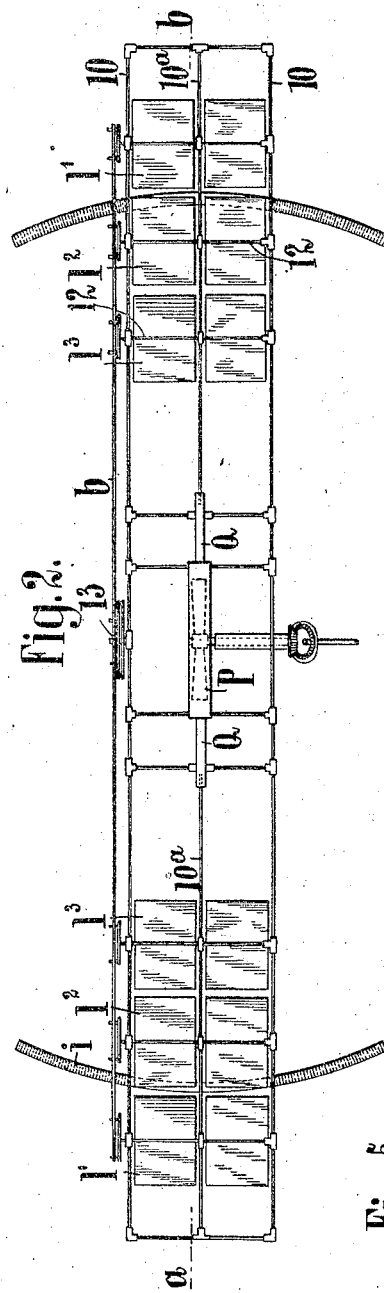
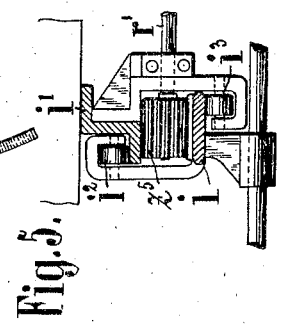
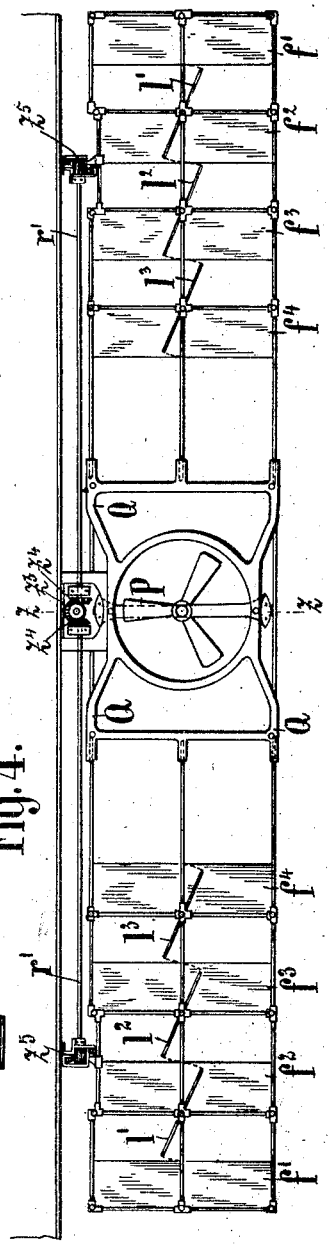
Witnesses.
Inventor.
Johann Schütte

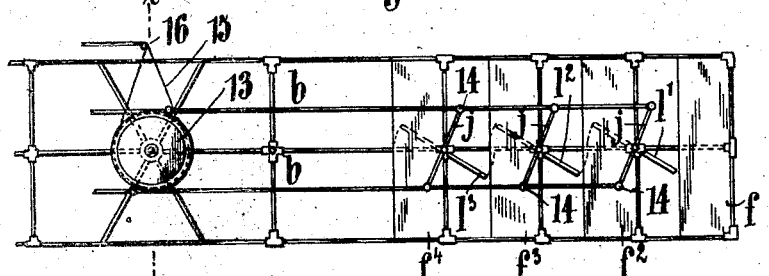
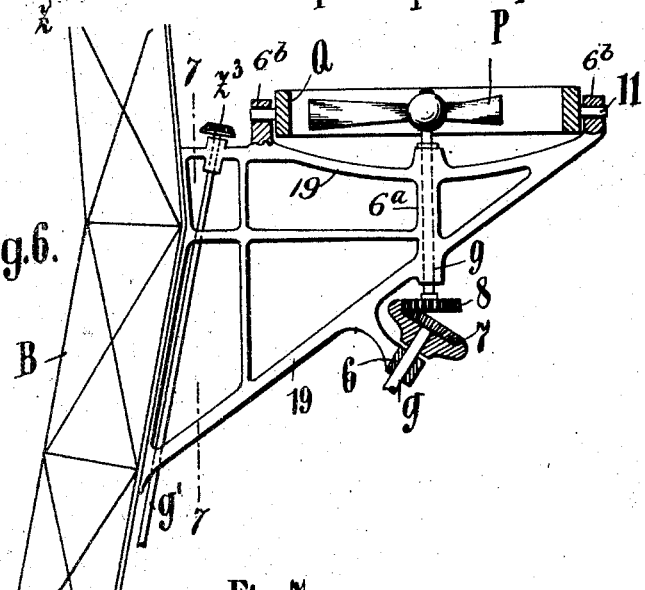
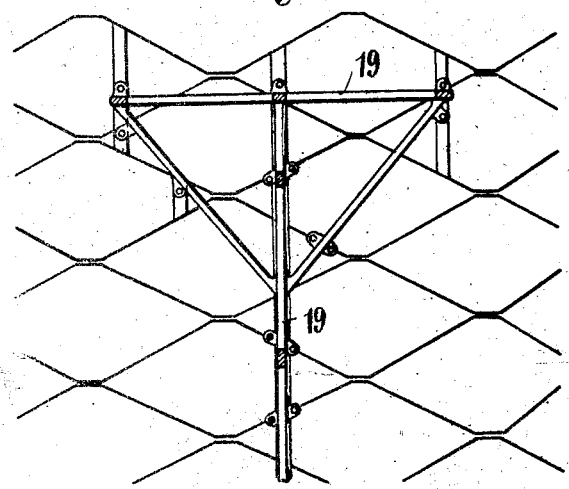

UNITED STATES PATENT OFFICE.

JOHANN SCHÜTTE, OF LANGFUHR, NEAR DANZIG, GERMANY.

STEERING MECHANISM FOR AIRSHIPS.

997,419.  Specification of Letters Patent.  Patented July 11, 1911.

Application filed July 14, 1909. Serial No. 507,551.

*To all whom it may concern:*

Be it known that I, JOHANN SCHÜTTE, a subject of the King of Prussia, residing at Langfuhr, near Danzig, Germany, have invented certain new and useful Improvements in Steering Mechanism for Airships; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to steering apparatus for air-ships and has for its object to unite in a single mechanism means for ascending, steering and stabilizing the air-ship, there being one or more of such devices on each side of the air-ship, and mechanism whereby they may be simultaneously actuated, together with details of construction hereinafter to be particularly pointed out and claimed.

Referring to the drawings, in which like parts are similarly designated, Figure 1 is a vertical section taken through an air-ship and its car, and a single mechanism on one side of the air-ship, for ascending, steering and balancing the air-ship, this mechanism being duplicated on the other side of the air-ship. Fig. 2 is a side elevation of the steering mechanism. Fig. 3 is a plan view of a portion of the same. Fig. 4 is a section on the line $a$—$b$ of Fig. 2. Fig. 5 is a detail partly in section. Fig. 6 is an enlarged detail view of the steering-mechanism support and Fig. 7 is a section on line 7—7 of Fig. 6.

The outer surface or casing of the balloon is indicated at B and may consist of a frame-work of any suitable description.

C indicates the car of any description connected to the frame-work B of the balloon and which contains a motor D of any suitable description, capable of driving a gear wheel $z^7$. This gear wheel meshes with a gear wheel $z^6$ capable of driving a shaft 2 which shaft carries at each end bevel gear wheels 3 meshing respectively with bevel gear wheels 4 on a flexible driving shaft $g$, said driving shaft being here shown as formed of two sections connected by a Cardan or universal joint 5.

The upper end of the driving shaft $g$ is journaled in a bearing 6 formed in a bracket 19 (Figs. 6 and 7) which is connected to the frame work B of the balloon and said driving shaft carries a bevel gear 7 which meshes with a gear 8 fixed on the lower end of a shaft 9, which is journaled in a bearing $6^a$ formed in the bracket 19. The upper end of the shaft 9 carries a propeller P which is surrounded by a forked frame Q, Fig. 4, mounted on horizontal pivots 11 journaled in bearings $6^b$ also formed in said bracket 19.

The gear wheel $z^7$ or gear wheel $z^6$, as the case may be, is capable of being shifted on its shaft whereby the driving mechanism for the propeller P may be connected and disconnected from the motor.

The forked frame Q carries box-like skeleton extensions 10, one on each side of the center thereof. Each extension has a horizontal medial framing $10^a$ dividing these extensions into upper and lower portions. Secured across the framing on the bottom and the top thereof are planes composed of a number of sections $f'$, $f^2$, $f^3$, $f^4$ of a suitable fabric and mounted within the frame in the upper and lower sections thereof, between the planes are a number of rudders $l'$ $l^2$, $l^3$, each provided with a vertical shaft 12 and on the upper end of each is secured a cross arm $j$.

Mounted above the center of the framing is a disk or wheel 13 located intermediate the sides of the framing 10. Preferably directly over the center of oscillation of the framing extending over and along the framing and pivotally connected at diametrically opposite points of the wheel 13 are rods $b$, one on each side of the center of the framing and wheel 13. These rods are substantially parallel to one another and between them are pivotally connected the rods $j$ at points 14, as indicated at Fig. 3. Passing around the wheel 13 and secured at one point thereof is an operating rope or cord 15 passing over a guide or a guide pulley 16 and being guided in any desired manner down to the car. These ropes are manipulated by hand in order to set the rudders $l'$, $l^2$, $l^3$ as may be desired, on one side of the air-ship or on the other side independently of one another. The framing carries on each side of the center of oscillation 11 thereof a toothed sector $i$ having for center the axis of oscillation $z$, $z$ of the frame. Opposite each rack $i$ is a sector $i'$, secured to the framing B of the balloon, serving for guiding, the structure of which is more clearly shown in Fig. 5. In order to facilitate such guidance, rollers $i^2$ and $i^3$ are provided, running on the parts $i'$ and $i$ respectively. With the racks $i$ mesh pinions $z^5$ carried by shafts $r'$ extending from the racks toward the center $z$, $z$ of oscillation of the framing, there being one of these shafts on each side of said center and both of these shafts $r'$ carry bevel gear wheels $z^4$. Both of the pinions $z^4$ mesh with a bevel gear $z^3$ on the end of a jointed operating shaft $g'$ carrying at its lower end within the car a bevel wheel $z^2$ which in turn is actuated by a bevel wheel $z'$ on a shaft $r$ carrying a bevel gear wheel 17, operated by a bevel gear wheel 18 on the shaft of a steering wheel $h$. The framings on each side of the air-ship are simultaneously swung on their axes of oscillation by the steering wheel $h$ as will be obvious from an inspection of Fig. 1.

By operating the steering wheel $h$ the shaft $r$ is rotated, imparting rotation to the jointed shaft $g'$ and the gear wheel $z^3$ which in turn rotates the gear wheel $z^4$ on each side of its center in opposite directions thereby rotating the shafts $r'$ in opposite directions at the same speed to swing the framing $Q^{10}$ about its center of oscillation $z$. By means of this device it is possible to cause the air-ship to ascend or descend without altering the horizontal position of the latter. The extent of swing for the proper operation of the air-ship should not exceed 20°, as any inclinations of the air-ship are disadvantageous to the motors.

I claim:—

1. In an air-ship, the combination with the balloon thereof and a car suspended beneath the latter, of a framing on each side of the balloon including planes and rudders, mechanism to rock the frames simultaneously on horizontal axes, and means to swing the rudders.

2. In an air-ship, the combination with the balloon thereof and a car suspended beneath the latter, of a framing on each side of the balloon including planes and rudders, mechanism to rock the frames on horizontal axes, a propeller mounted centrally in each frame and independent thereof, and mechanism for driving the propellers.

3. In an air-ship the combination with the balloon thereof, of a steering mechanism comprising a framing on each side of the balloon, planes and rudders on the framing, mechanism to rock the frames simultaneously on horizontal axes, independent means to swing the rudders, a propeller mounted centrally in each frame and independent thereof, and mechanism for driving the propeller.

4. In an air-ship the combination with the balloon, the car, and motor; of a propeller, mechanism for driving the same, means to connect and disconnect said mechanism from the motor, a pivotally mounted framing, racks on the balloon and framing, pinions meshing with the racks, means to operate the pinion from the car, a plane on the framing and pivoted rudders in the framing.

5. In an air-ship, the combination with the balloon, a car and motor, of a propeller on each side of the balloon, operating mechanism connecting the motor and propellers, a horizontally pivoted plane carrying frame surrounding each propeller, segmental racks mounted on the balloon and framing on each side of the pivots, pinions meshing with the racks, gears connected with said pinions mounted on each side of said pivots, a bevel gear in mesh with said gears, and means to operate the bevel gear from the car.

6. In an air-ship, the combination with the balloon, a car suspended beneath the balloon, and a motor in the car, of a propeller rotatable on a vertical axis on each side of the balloon, operating mechanism connecting the motor and propellers, a forked frame surrounding each propeller mounted on horizontal pivots and having extension members on each side of the pivots, horizontal planes on the extension members, and vertically mounted rudders pivoted between the planes.

7. In an air-ship, the combination with the balloon, a car suspended beneath the balloon, and a motor in the car, of a propeller rotatable on a vertical axis on each side of the balloon, operating mechanism connecting the motor and propellers, a forked frame surrounding each propeller mounted on horizontal pivots and having extension members on each side of the pivots, horizontal planes on the extension members, vertically mounted rudders pivoted between the planes and means to rock the frames simultaneously.

8. In an air-ship, the combination with the balloon, a car suspended beneath the balloon, and a motor in the car, of a propeller rotatable on a vertical axis on each side of the balloon, operating mechanism connecting the motor and propellers, a forked frame surrounding each propeller mounted on horizontal pivots and having extension members on each side of the pivots, horizontal planes on the extension members, vertically mounted rudders pivoted between the planes, means to rock the frames simultaneously, and means to swing the rudders on their axes.

In testimony that I claim the foregoing as my invention, I have signed my name in presence of two subscribing witnesses.

JOHANN SCHÜTTE.

Witnesses:
 PROF. ZUTMER,
 KARL WALTHER.